US010972191B2

(12) United States Patent
Tong et al.

(10) Patent No.: US 10,972,191 B2
(45) Date of Patent: Apr. 6, 2021

(54) UPLINK INTERFERENCE GEOLOCATION METHOD AND SYSTEM FOR HIGH THROUGHPUT SATELLITE

(71) Applicant: Asia Satellite Telecommunications Company Limited, Wanchai (HK)

(72) Inventors: Roger Shun Hong Tong, New Territories (HK); Fred Chun Yin Vong, New Territories (HK); Harry Yin Chung Leung, New Territories (HK); Hai Hu, New Territories (HK); Man Hei Chan, New Territories (HK); Kat Fan Yip, New Territories (HK)

(73) Assignee: Asia Satellite Telecommunications Company Limited, Wanchai (HK)

( * ) Notice: Subject to any disclaimer, the term of this patent is extended or adjusted under 35 U.S.C. 154(b) by 18 days.

(21) Appl. No.: 15/986,318

(22) Filed: May 22, 2018

(65) Prior Publication Data
US 2019/0363803 A1    Nov. 28, 2019

(51) Int. Cl.
*H04B 15/00* (2006.01)
*H04B 7/185* (2006.01)

(52) U.S. Cl.
CPC ........... *H04B 15/00* (2013.01); *H04B 7/1851* (2013.01)

(58) Field of Classification Search
CPC ...... H04B 15/00; H04B 7/1851; H04B 7/185; H04B 7/15; H04B 7/14
USPC .......................................... 370/316
See application file for complete search history.

(56) References Cited

U.S. PATENT DOCUMENTS

| | | | | |
|---|---|---|---|---|
| 6,728,544 B1* | 4/2004 | Boyer | ................... | H04W 16/10 455/450 |
| 2009/0093213 A1* | 4/2009 | Miller | ................ | H04B 7/18528 455/12.1 |
| 2010/0261440 A1* | 10/2010 | Corman | ................... | H01Q 3/34 455/91 |
| 2012/0140658 A1* | 6/2012 | Kanzaki | ............... | H04B 7/0426 370/252 |
| 2012/0154213 A1* | 6/2012 | Bull | ....................... | H04K 3/228 342/357.25 |

(Continued)

FOREIGN PATENT DOCUMENTS

WO    WO-2005027358 A2 *    3/2005    ......... H04B 7/18513

OTHER PUBLICATIONS

Chan, "Application of a Dual Satellite Geolocation System on Locating Sweeping Interference," World Academy of Science, Engineering and Technology International Journal of Civil and Architectural Engineering vol. 6, No. 9, 2012, 6 pages.

*Primary Examiner* — Jeffrey M Rutkowski
*Assistant Examiner* — Luna Weissberger
(74) *Attorney, Agent, or Firm* — Hanley, Flight and Zimmerman, LLC

(57) ABSTRACT

A geolocation method and system for locating the source of interference to a high throughput satellite. The method involves determining relative power level differences between interference signals received by the victim spot beam and co-colored nearby spot beams on the same satellite. Using beam pattern data, the relative power levels for a pair of beams determines contour lines of possible location the correspond to the relative power difference in the signals received by the two beams in the pair. A point of intersection of contour lines from multiple pairs of spot beams indicates the location of the source of interference.

18 Claims, 12 Drawing Sheets

(56) References Cited

U.S. PATENT DOCUMENTS

| | | | | |
|---|---|---|---|---|
| 2012/0256789 A1* | 10/2012 | Bull | ............... | G01S 5/0221 |
| | | | | 342/357.25 |
| 2014/0045420 A1* | 2/2014 | Tong | ............... | H04B 7/18506 |
| | | | | 455/12.1 |
| 2014/0087651 A1* | 3/2014 | Heo | ............... | H04W 40/22 |
| | | | | 455/7 |
| 2015/0189513 A1* | 7/2015 | Schmidt | ............... | H04W 16/02 |
| | | | | 370/329 |
| 2015/0327078 A1* | 11/2015 | Zhu | ............... | H04W 16/28 |
| | | | | 370/328 |
| 2017/0185954 A1* | 6/2017 | McAllister | ............... | G06Q 10/087 |
| 2017/0366263 A1* | 12/2017 | Turgeon | ............... | H04B 10/118 |

\* cited by examiner

UPLINK INTERFERENCE GEOLOCATION METHOD AND SYSTEM FOR HIGH THROUGHPUT SATELLITE

TECHNICAL FIELD

The present application relates to satellite communications, and more particularly to methods and systems for geolocation of uplink interference sources for a high throughput satellite (HTS).

BACKGROUND

Conventional fixed-service satellite (FSS) systems use one or more large wide beams to cover a large geographic area. At times, the satellite may be subject to interference from an uplink signal in its operating frequency band. It is valuable to be able to identify the location of such a signal so as to take corrective action. Existing techniques for geolocating such a signal rely on time-difference-of-arrival and frequency-difference-of-arrival techniques involving the satellite and a ground station and a second nearby satellite using the same spectrum and a ground station. This can be difficult to realize in practice.

Modern satellite communication is moving away from FSS towards high throughput satellite (HTS) systems in which the satellite employs a large number of narrow spot beams and relies on color re-use to improve throughput at each beam. HTS is considered particularly attractive because it enables higher throughput for both uplink and downlink, and modern satellite communication needs place a greater emphasis on two-way traffic, i.e. both uplink and downlink to end equipment, such as for satellite-based mobile internet. This means that the HTS systems can expect significantly more uplink signals from end points, will rely more heavily on being able to accurately received and route those signals, and may be at greater risk of suffering interference from accidental or malicious uplink signals.

Accordingly, it would be advantageous to have improved methods and systems for geolocating the source of an uplink interference signal.

BRIEF DESCRIPTION OF THE DRAWINGS

Reference will now be made, by way of example, to the accompanying drawings which show example embodiments of the present disclosure, and in which.

Like reference numerals are used in the drawings to denote like elements and features.

DETAILED DESCRIPTION

Figure 1:
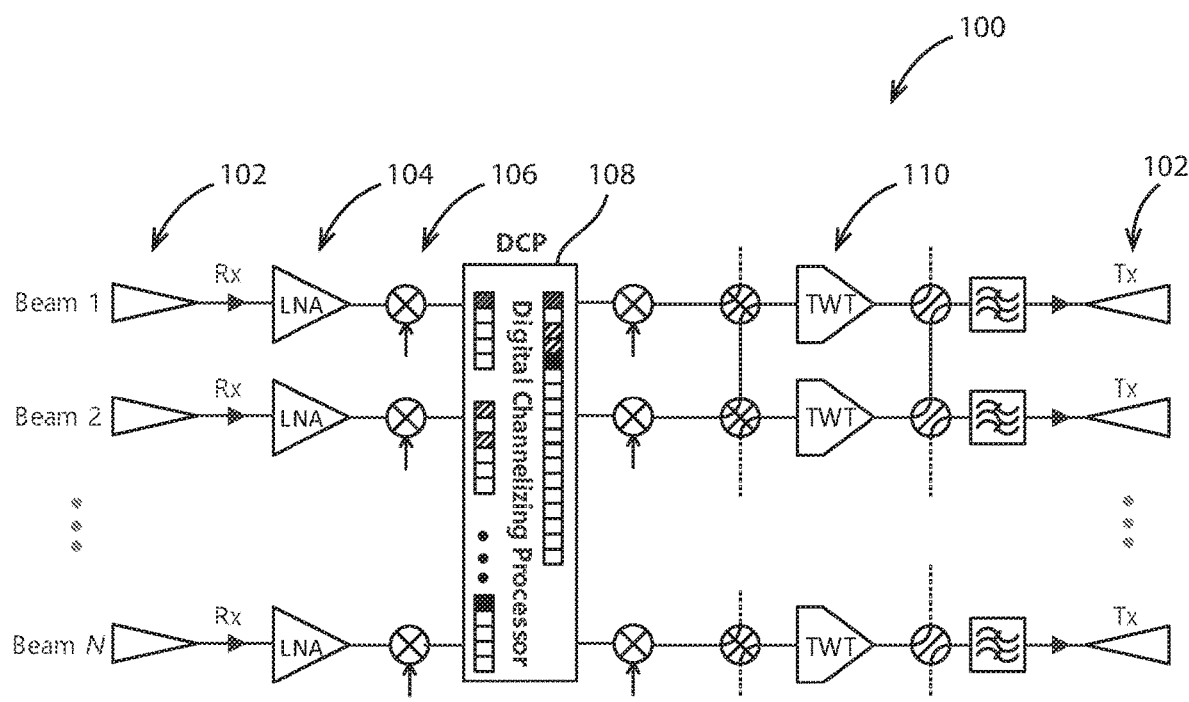
FIG. 1 shows, in block diagram form, one example of an HTS payload.

In one aspect, the present application describes a satellite system to locate an uplink interference source. The system may include a plurality of co-coloured spot beam antennas to receive uplink signals and with each spot beam having a respective geographic coverage area, the respective coverage areas of the co-coloured spot beam antennas being arranged in a grid of non-overlapping areas in a color re-use pattern; a digital channelizing processor to digitally channelize received signals from each co-coloured spot beam antennas to produce respective digitized spectrum; a spectrum analysis module to identify an interference carrier in one of the digitized spectrums and to determine relative power levels between the interference carrier in said one of the digitized spectrums and a lower power interference carrier at a same frequency in two or more of the other respective digitized spectrums; and a geolocation module to, for each of the relative power levels, determine contour lines of geographic location based on that relative power level, and to identify a geographical location of the uplink interference source based on an intersection between two or more of the contour lines.

In another aspect, the present application describes a method to locate an uplink interference source using a high throughput satellite having a plurality of co-colored spot beam antennas to receive uplink signals and with each spot beam having a respective geographic coverage area, the respective coverage areas of the co-colored spot beam antennas being arranged in a grid of non-overlapping areas in a color re-use pattern. The method may include digitally channelizing received signals from each co-coloured spot beam antennas to produce respective digitized spectrum; detecting an interference carrier in one of the digitized spectrums; determining relative power levels between the interference carrier in said one of the digitized spectrums and a lower power interference carrier at a same frequency in two or more of the other respective digitized spectrums; for each of the relative power levels, determining contour lines of geographic location based on that relative power level; and identifying a geographical location of the uplink interference source based on an intersection between two or more of the contour lines.

In another aspect, the present application provides a method to locate an uplink interference source using a high throughput satellite having a plurality of co-colored spot beam antennas to receive uplink signals and with each spot beam having a respective geographic coverage area, the respective coverage areas of the co-colored spot beam antennas being arranged in a grid of non-overlapping areas in a color re-use pattern, the high throughput satellite to receive and digitally channelize signals from each co-colored spot beam antenna to produce respective digitized spectrum, to detect an interference carrier in one of the digitized spectrums. The method may include receiving, from the high throughput satellite at a ground network operations center via a communications link, data regarding power levels of the interference carrier in three or more of the digitized spectrums; determining, from the data regarding power levels, relative power levels between the interference carrier in said one of the digitized spectrums and a lower power interference carrier at a same frequency in two or more of the other respective digitized spectrums; for each of the relative power levels, determining contour lines of geographic location based on that relative power level; and identifying a geographical location of the uplink interference source based on an intersection between two or more of the contour lines.

Other example embodiments of the present disclosure will be apparent to those of ordinary skill in the art from a review of the following detailed description in conjunction with the drawings.

Any feature described in relation to one aspect or embodiment of the invention may also be used in respect of one or more other aspects/embodiments. These and other aspects of the present invention will be apparent from, and elucidated with reference to, the embodiments described herein.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

Satellite Overview

Satellites are devices positioned in orbital space that are used for various purposes. In one example embodiment, the satellites are communication satellites. That is, they are positioned in orbital space for the purpose of providing communications. For example, communication satellites are designed to relay communication signals between two end-points (which may be stationary or mobile) to provide communication services such as telephone, television, radio and/or internet services.

The satellites may employ a variety of orbital paths around the Earth. For example, satellites may have geostationary orbits, molniya orbits, elliptical orbits, polar and non-polar Earth orbits, etc. Communication satellites typically have geostationary orbits. That is, the satellites have a circular orbit above the Earth's equator and follow the direction of the Earth's rotation. A satellite in such an orbit has an orbital period equal to the Earth's rotational period, and accordingly may appear at a fixed position in the sky for ground stations.

Communication satellites are typically spaced apart along the geostationary orbit. That is, the satellites are positioned in orbital slots. The satellite operators coordinate their use of orbital slots with each other under international treaty by the International Telecommunication Union (ITU), and the separation between slots depends on the coverage and frequency of operation of the satellites. For example, in at least some example embodiments, the separation between satellites may be between 2-3 degrees of orbital longitude. In at least some example embodiments, the separation between satellites may be less than 2 degrees of separation. The separation of satellites in such a manner allows for frequency reuse for both uplink and downlink transmission. For example, by separating adjacent satellites by a distance greater than the transmitting beamwidth (i.e., the angle, measured in a horizontal plane, between the directions at which the power of the beam is at least one-half its maximum value) of an antenna associated with the ground station for uplink transmission, the same frequency for the communication signals may be employed to uplink to adjacent satellites with interference at or below the coordinated level. Similarly, if the separated distance between the adjacent satellites is greater than the receiving beamwidth of the antenna associated with the ground station for downlink transmission, the same frequency for the communication signals may be employed to downlink from adjacent satellites with interference at or below the coordinated level.

In order to perform communication functions, the satellite is equipped with various components. For example, the satellite may include a communication payload (which may further include transponders, one or more antennas, and switching systems), engines (to bring the satellite to the desired orbit), tracking and stabilization systems (used to orient the satellite and to keep the satellite in the correct orbit), power subsystems (to power the satellite) and command and control subsystems (to maintain communication with ground control stations).

The transponder of the satellite forms a communication channel between two end-points to allow for communications between the two end-points. The transponder also defines the capacity of the satellite for communications.

The antenna of the satellite transmits and receives communication signals. More specifically, the antenna is an electronic component that converts electric currents (which may be generated by a transmitter) to propagating radio frequency (RF) signal during transmission, and converts induced RF signals to electric currents during reception. In at least some example embodiments, the antenna may be associated with an amplifier which may amplify the power of the transmitted or received RF signals.

The communication signals may be microwave signals. Microwave signals are RF signals that have wavelengths ranging from as long as one meter to as short as one millimeter. Equivalently, the frequency of the RF signals may range from 300 MHz to 300 Ghz. More particularly, the communication signals are within certain frequency bands of microwave signals as they are more suited for satellite communications. For example, in at least some example embodiments, a satellite may operate within the frequency of the C-band defined by the ITU. The C-band is a portion of the electromagnetic spectrum that ranges from approximately 4 GHz to 8 GHz. That is, the communication signals are transmitted by and received at the satellite within such a frequency range. In some cases, the satellite may operate within frequencies higher than 8 GHz. For example, the satellite may operate within the frequency of the Ku-band. The Ku-band is the portion of the electromagnetic spectrum that ranges from approximately 10 GHz to 18 GHz. In at least some example embodiments, the satellite may operate within other high frequencies above the Ku-band. For example, the satellite may operate within the Ka-band frequency. The Ka-band is the portion of the electromagnetic spectrum that ranges from approximately 26.5 GHz to 40 GHz (at present, the assigned slots for fixed satellite service (FSS) are 27-31 GHz for uplink and 17.7-21.2 GHz for downlink). In some examples, the satellite may be configured to operate in more than one band. In one example, the satellite may be equipped to receive and transmit signals within the C-band, Ku-band, and Ka-band. It will be appreciated that the satellites may operate within other microwave frequency bands. For example, the satellites may operate in any one of the defined microwave frequency bands ranging in frequencies from approximately 1 GHz to 170 GHz. Examples of other microwave frequency bands may include the X-band, Q-band, V-band, etc.

High Throughput Satellite Systems

In a conventional fixed-satellite service (FSS) system, one or several large beams (e.g. a semi-global beam for C-band and a few regional beams for Ku-band) are typically used to cover the desired areas, as described above.

In a high throughput satellite (HTS) system, a satellite uses multiple narrow spot beams (e.g. 0.6 deg Ka or Ku-band beams). These spot beams are arranged in a pattern to cover a desired area. An HTS system typically relies on "color re-use". Different portions of the spectrum used by different spot beams, or the same portion but using a different polarization, are referred to as different "colors". That is, each color represents a segment of spectrum with a bandwidth and polarization that can be accessed by the end users inside the coverage area of that spot beam. Using spatial separation, each color can be reused by multiple beams to increase the system capacity. In many implementations, the HTS system tries to minimize interference in both downlink and uplink signals by ensuring that adjacent beams use different colors. Typically, use of fewer colors will lead to higher inter-beam interference, especially at the edge of coverage (EOC), however, the overall throughput of the system may also become higher as more bandwidth is allocated to each coverage area. A conventional HTS network design may use a 4-color reuse scheme, but some systems may have 2-colors, 6-colors, 8-colors or more. It will be understood that a 2-color reuse pattern will result in some adjacent beams using the same color.

Reference is made to FIG. 1, which shows, in block diagram form, one example of an HTS payload 100. The HTS payload 100 in this example includes N spot beam antennas 102. Signals received in one of the spot beam antennas 102 are amplified by low noise amplifiers (LNA) 104, down-converted in mixers 106, and input to a digital channelizing processor (DCP) 108. The DCP 108 digitized the down-converted spectrum to produce digitized spectrum to enable fast analysis and switching operations, including channel switching or reassignment. The digitized channels, are output by the DCP 108 for up-conversion, amplification (typically via traveling wave tube 110), and transmission via the antennas 102.

Geolocation of Interference Sources

Satellites are sometimes subject to uplink interference, where an unwanted signal is detected by the receive antenna of the satellite within its operating bandwidth. The uplink interference may cause problems with use of one or more channels. The uplink interference may be malicious or unintentional. It is valuable to be able to identify the source of uplink interference in either case. One of the challenges, however, is that the coverage area of a beam, even a spot beam, is a large geographic area. Identifying the geographic location of the source of the interference signal is very valuable, but also challenging.

In an FSS system, geolocation of uplink interference is possible, but requires the active participation of an adjacent satellite. The technique generally relies on the calculation of time difference of arrival (TDOA) and frequency difference of arrival (FDOA) of signals between the primary satellite/ground station and between a reference satellite/ground station. In other words, at least two geosynchronous satellites and two ground stations are needed to identify the location of the interference source. The reference satellite must be adjacent to the victim satellite, and must share the same spectrum and coverage, making geolocation practically very difficult.

In an HTS system, uplink interference may be a larger potential problem since HTS is more like to involve two-way data communication to households and mobile users, i.e. uploading and downloading at the same time.

Advantageously, in one aspect, the present application provides for a method and system of geolocation of uplink interference at an HTS system that does not rely on an adjacent satellite or upon TDOA or FDOA. In some implementations, the geolocation method takes advantage of the color re-use spot beam layout and the digital channelizing technology.

Figure 2:
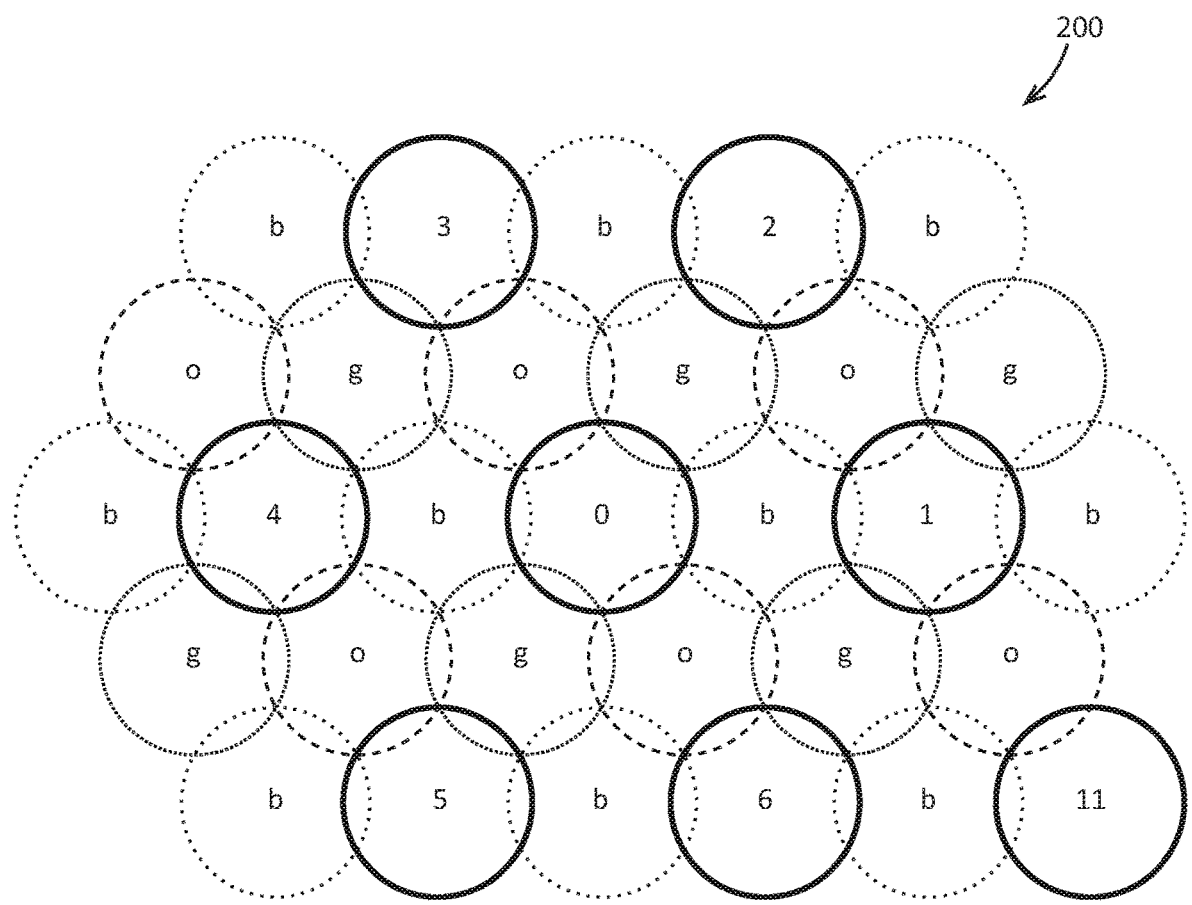
FIG. 2 shows an example coverage area for an HTS system in a four-color re-use pattern.

FIG. 2 illustrates an example of a portion of a coverage area 200 of an HTS system. The coverage area 200 is formed through a grid of individual spot beam coverage areas. Color re-use is employed to minimize interference through ensuring adjacent beams (i.e. adjacent coverage areas) do not use the same color. To illustrate the concept, the example shown in FIG. 2 labels individual coverage areas as either red, blue (b), green (g), or orange (o). The co-colored "red" coverage areas are illustrated in a heavier line weight and are individually labelled as beams 0, 1, 2, 3, 4, 5, 6, and 11. It will be appreciated that although the coverage areas are indicated as isolated circles the beam gain pattern extends beyond the indicated circle. The illustrated circle may indicate a −3 dB point, for example.

Figure 3:
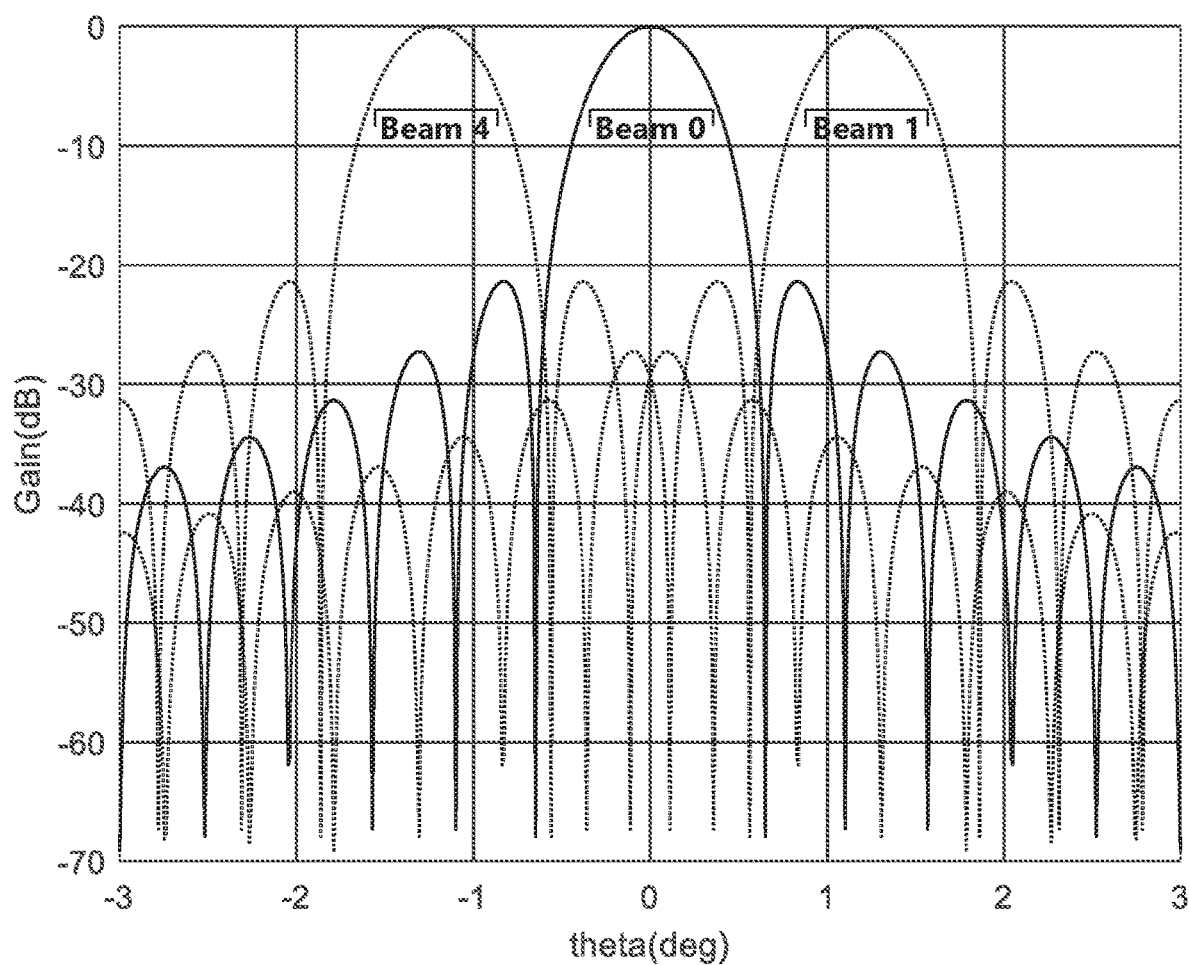
FIG. 3 shows a 1D beam pattern cut illustrating the overlap of three co-colored beam patterns.

FIG. 3 shows an example of a 1-D pattern cut of three co-colored beams: beams 0, 1 and 4. It will be noted that the gain pattern of beam 4, for example, is still seen in the beam pattern of beam 0, albeit at a significantly attenuated gain. Accordingly, any interfering uplink carrier sent from a position within the coverage area of one of the beams may be detectable, at a lower power, in the surrounding co-colored beams. In practice, the power can be picked up by an adjacent spot beam antenna depends on the isolation level between the two patterns and the receiver sensitivity of the adjacent beam.

The uplink spectrum of each user beam may be digitized and processed by the onboard DCP at the satellite and then routed to the downlink beams. With advanced analog-to-digital IC chips and DSP processors, many advanced digital spectrum analysis functions can be realized onboard the payload. For example, the DCP may be adapted to measure power of a particular carrier within the digitized spectrum. In accordance with one aspect of the present application, when an interfering UL carrier is received by the satellite, the power levels received by all co-colored beams can then be measured and used to geo-locate the source of the UL signal. The geolocation may be done onboard the satellite or the power measurements (absolute or relative) may be relayed to the ground network operation center (NOC) via the DCP high-speed link telemetry and geolocation done by the NOC.

When an interfering UL carrier is detected in one beam—the "victim" beam—then the satellite may measure any corresponding UL carrier in the nearest co-colored beams, i.e. beams 1 to 6. The next "ring" of co-colored beams, e.g. beam 11, may be included in the process, if needed, as will be described further below, if the received carrier power level for that more-distant beam is still within the dynamic range of the beam input receiver.

Figure 4:
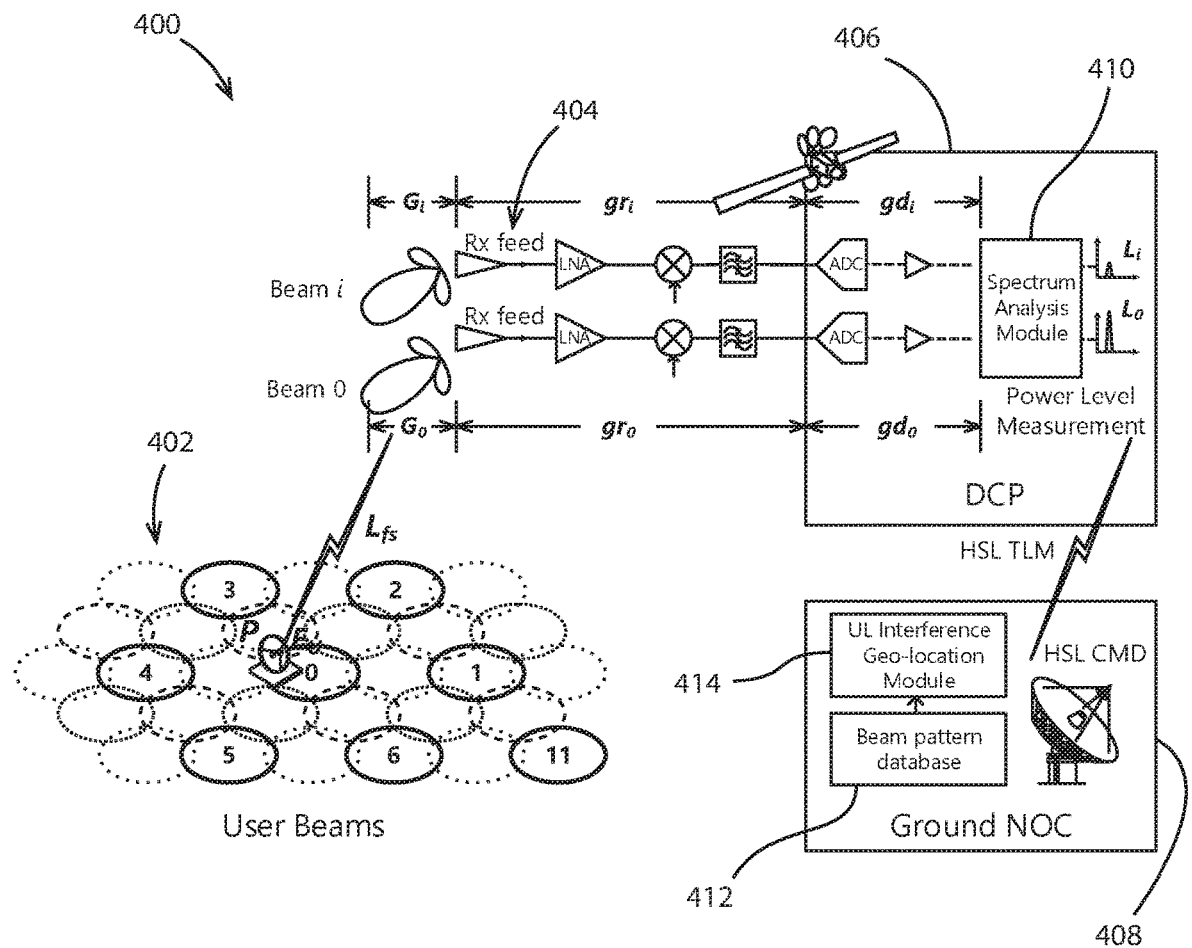
FIG. 4 illustrates an uplink portion of an example satellite system.

Reference is now made to FIG. 4, which illustrates an uplink portion of an example satellite system 400, including a grid of spot beam coverage areas 402 using a 4-color re-use pattern, a victim beam 0, and a nearby co-colored spot beam i. The system 400 includes receive antennas 404 for the two spot beams, a DCP 406, and, in this example, a ground NOC 408 that receives data from the satellite via a high-speed link telemetry (HSL TLM). The DCP 406 includes a spectrum analysis module 410 configured to measure the power level of an interference carrier within the digitized spectrum.

There are various losses/gains in the paths travelled by a signal that is to be measured by the two spot beams 0 and i. The interfering station's UL equivalent isotropically radiated power (EIRP) is designated $E_U$. The free space loss from the station to the satellite antenna is $L_{fs}$. The spot beam Rx antenna gains towards the interfering station are $G_0$ and $G_i$ for beam 0 and beam i, respectively. The transponder path loss (or gain) from the antenna output up to the DCP input and from the DCP input up to the spectrum analysis module are denoted as $gr_0$, $gd_0$ and $gr_i$, $gd_i$ for beam 0 and beam i, respectively. Among these parameters, $E_U$ and $L_{fs}$ are unknown due to the nature of this geolocation problem. The path loss gr is known and is well-characterized during the payload ground test. The gain gd is known and may be altered by the HTS operator to adjust the input power level to the spectrum analysis module. The gd may be adjusted at sub-channel level (e.g. BW=1 MHz) without affecting the traffic in the rest of the spectrum. Given these quantities, the measured carrier power levels $L_0$ and $L_i$ may then be expressed as:

$$L_0 = E_U \cdot L_{fs} \cdot G_0 \cdot gr_0 \cdot gd_0 \quad (1)$$

$$L_i = E_U \cdot L_{fs} \cdot G_i \cdot gr_i \cdot gd_i. \quad (1)$$

The relative gain $g_{0,i}$ between $L_0$ and $L_i$ is then:

$$g_{0,i} = \frac{L_0}{L_i} = \frac{G_0 \cdot gr_0 \cdot gd_0}{G_i \cdot gr_i \cdot gd_i}, \quad (3)$$

where the unknown parameters $E_U$ and $L_{fs}$ have been cancelled out. Since gr and gd are already known, the equation (3) can be further simplified as $$g_{0,i} = \frac{L_0}{L_i} = c \frac{G_0}{G_i}, \quad (4)$$

where c is the constant normalized by gr and gd of the two transponder paths.

For co-colored beam 1 to 6, the satellite can then find $g_{0,1}$, $g_{0,2}$, ..., and $g_{0,6}$ accordingly.

Figure 5:
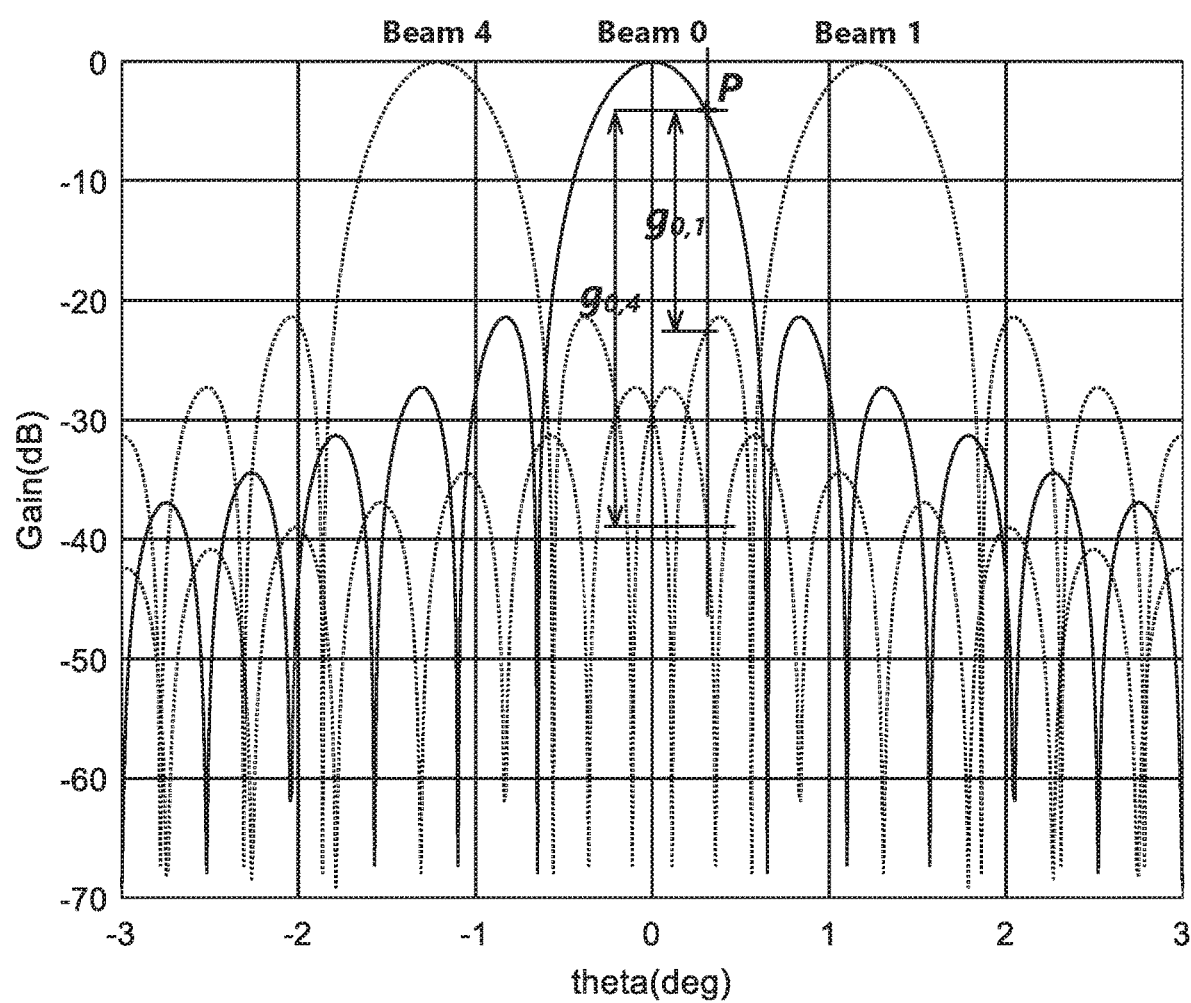
FIG. 5 shows the 1D beam pattern cut with relative gains illustrated thereon.

Referring also now to FIG. 5, the 1D pattern cut of FIG. 3 is shown with relative gains for beams 0 and 1 and beams 0 and 4, i.e. $g_{0,1}$ and $g_{0,4}$, indicated. It will be appreciated that once the relative gain between a pair of beams is known, the point or points in the 1D pattern cut that correspond to that relative difference in patterns may be identified. It will further be understood that FIG. 5 is a 1D pattern cut. In 2D, the relative gain between a pair of beam patterns corresponds to a contour plot. The point where two or more relative gain contour lines intersect is the likely location of the interference source.

The gain pattern of each beam may be obtained during the HTS payload test phase. The HTS payload test phase may include measuring the gain pattern for each individual antenna in X-Y (or U-V) plane cuts before integrating the antenna into the satellite during assembly. The measurement data may be compared to simulation data to verify design parameters. These gain patterns may be stored in a beam pattern database 412. In some cases, the beam pattern database 412 may store 2D beam patterns or beam-pair relative gain contour plots for ranges of relative gains. In any case, an UL interference geolocation module 414 uses the relative gain between beam pairs measured by the spectrum analysis module 410 to find corresponding contour plots based on gain or relative gain data stored in the beam pattern database 412, and finds the point closest to the victim beam at which a contour line from each beam pair intersects. This analysis may be carried out automatically and the resulting intersection location data output to identify the likely geographical location of the interfering uplink signal source.

In some embodiments, the beam pattern database 412 and the UL interference geolocation module 414 may be implemented within the satellite instead of at the ground NOC 408.

Figure 6:
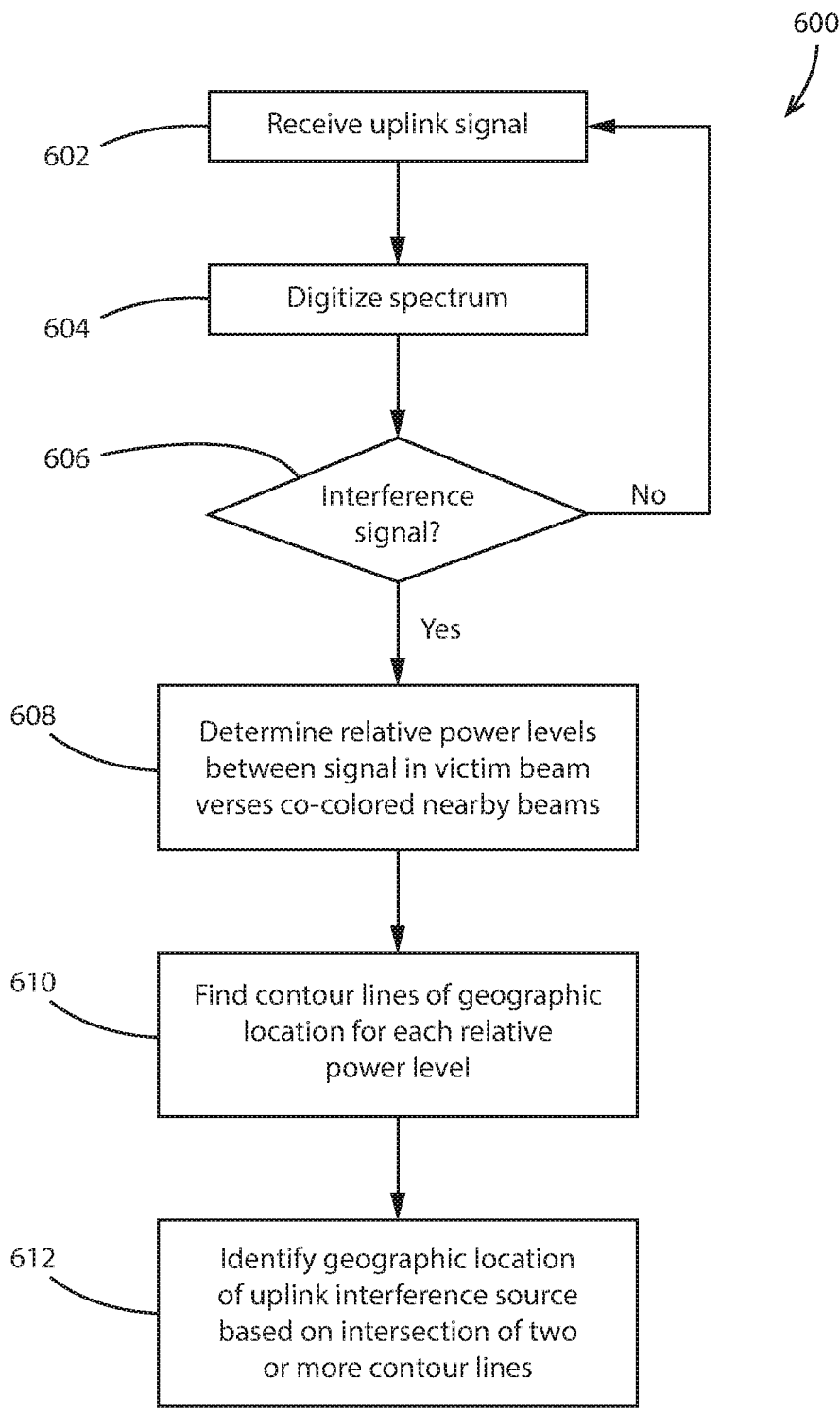
FIG. 6 shows, in flowchart form, an example method of locating an interference signal source.

Reference is now made to FIG. 6, which shows, in flowchart form, an example process 600 for geolocation of an interference carrier source to a high throughput satellite. The process 600 includes receiving uplink signals at the HTS payload, as indicated by operation 602. The uplink signal are within the operating band of spectrum used by the HTS. As described above, individual spot beams will received signal within their assigned "color" of spectrum, i.e. the portion of operating spectrum assigned to them and having the correct polarization.

In operation 604, the received spectrum is digitized by the DCP onboard the HTS. In the normal course, the DCP goes on to also channelize the spectrum from each spot beam and route uplink channels to the correct downlink channels. In this case, the DCP, after digitizing the spectrum, identifies an interference carrier as indicated by operation 606.

The DCP may identify an interference carrier in part based on the frequency plan for that spot beam. For example, the frequency plan may include a particular range of frequencies. A carrier outside that range of frequencies but within the operating range of the spot beam may be an interference carrier. In another example, the carrier may be within the frequency plan of the spot beam. In that case, the frequency plan may have an associated series of spectrum masks that are set to indicate the expected normal variation range of legitimate uplink carriers. If a carrier violates the mask lines (e.g. exceeds, in most continuous wave interferer cases), then it may be an interference carrier. Even if the interference carrier does not break the mask lines—i.e. it operates within the spectrum mask—it may be detectable as degradation of the Es/No (Energy per Symbol to Noise power spectral density) value of a demodulated legitimate carrier.

If the DCP identifies an interfering carrier in operation 606 then the DCP measures the relative gain between pairs of co-colored beams, with the victim beam being one of the beams in each pair. As described above, the surrounding six beams in a four-color re-use pattern may be used in some implementations. At the edge-of-coverage (EOC) fewer than six neighbouring co-colored beams may be available. The analysis may rely on fewer than six, or may incorporate additional more-distant co-colored beams provided the carrier is detectable in the received and digitized spectrum for those more-distant co-colored beams.

The relative gains between the victim beam and its co-colored neighbour beams are then used in operation 610 to determine contour lines indicating possible source locations that correspond to each relative gain value. The relative gain value for a pair of beams will result in a geographic line segment or curve marking those locations where the relative gain between the two antenna beam patterns matches the measured relative gain. In operation 612, the uplink interference geolocation module identifies the location at which at least one contour line from each beam all intersect. This location marks the likely location of the interference carrier source.

To illustrate by way of example, consider a situation in which an uplink interference carrier is detected in beam 0. Reference may be made back to FIG. 2, which shows the pattern of co-colored "red" beams 0 to 6. At the DCP onboard the satellite, having determined that beam 0 is receiving an interference carrier, the DCP locates the interference carrier in the spectrum of the co-colored beams 1-6. The interference carrier will having the same shape and frequency, but a lower power. For this example, the measured carrier power in dBm and the relative gain between beam 0 and each other beam is given in the following table:

|  | HTS beams | | | | | | |
| --- | --- | --- | --- | --- | --- | --- | --- |
|  | Beam 0 | Beam 1 | Beam 2 | Beam 3 | Beam 4 | Beam 5 | Beam 6 |
| DCP carrier power (dBm) | −7.0 | −49.2 | −28.0 | −45.3 | −32.2 | −37.4 | −31.5 |
| Beam relative gain $g_{0,i}$ (dB) | 0.0 | 42.2 | 21.0 | 38.3 | 25.2 | 30.4 | 24.5 |

Figure 7:
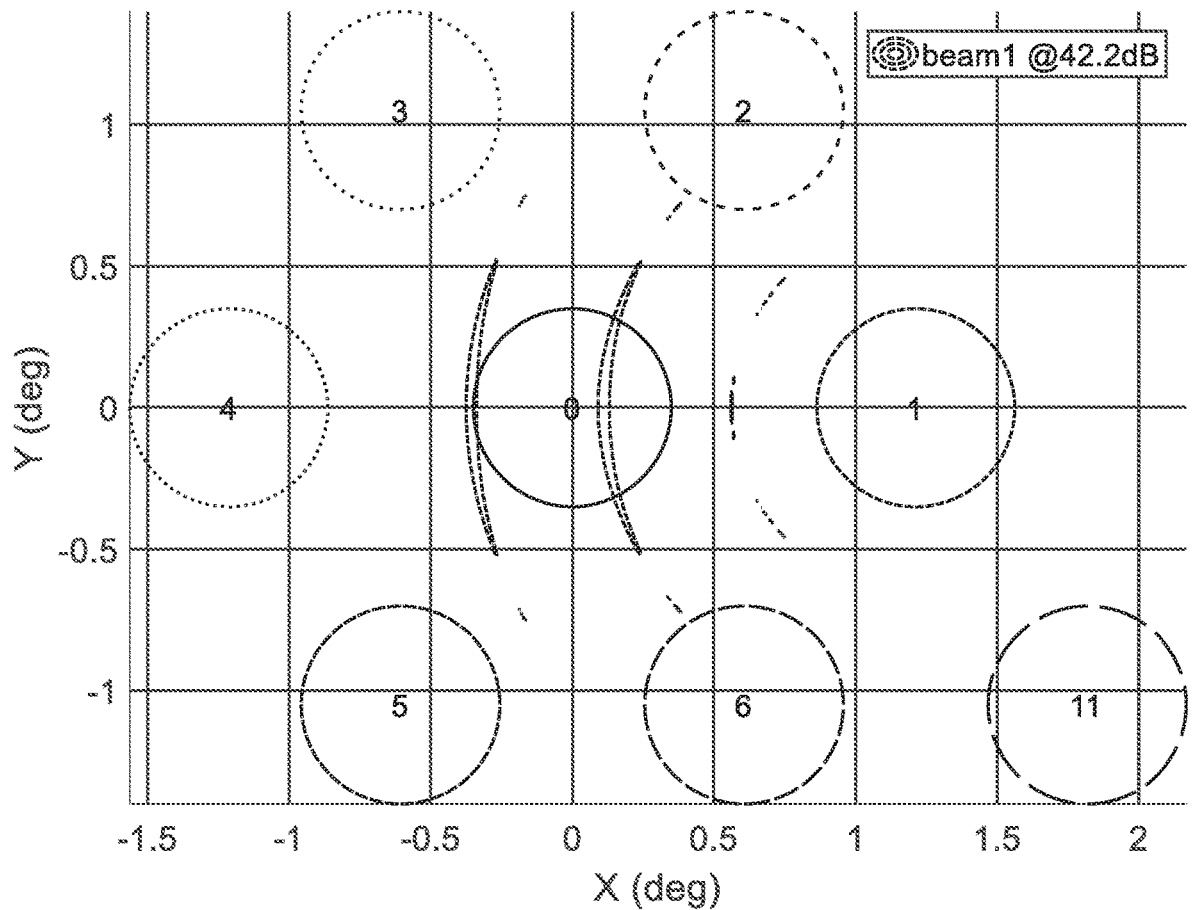
FIG. 7 shows contour lines corresponding to relative gain determined for one beam pair, in an example.
Figure 8:
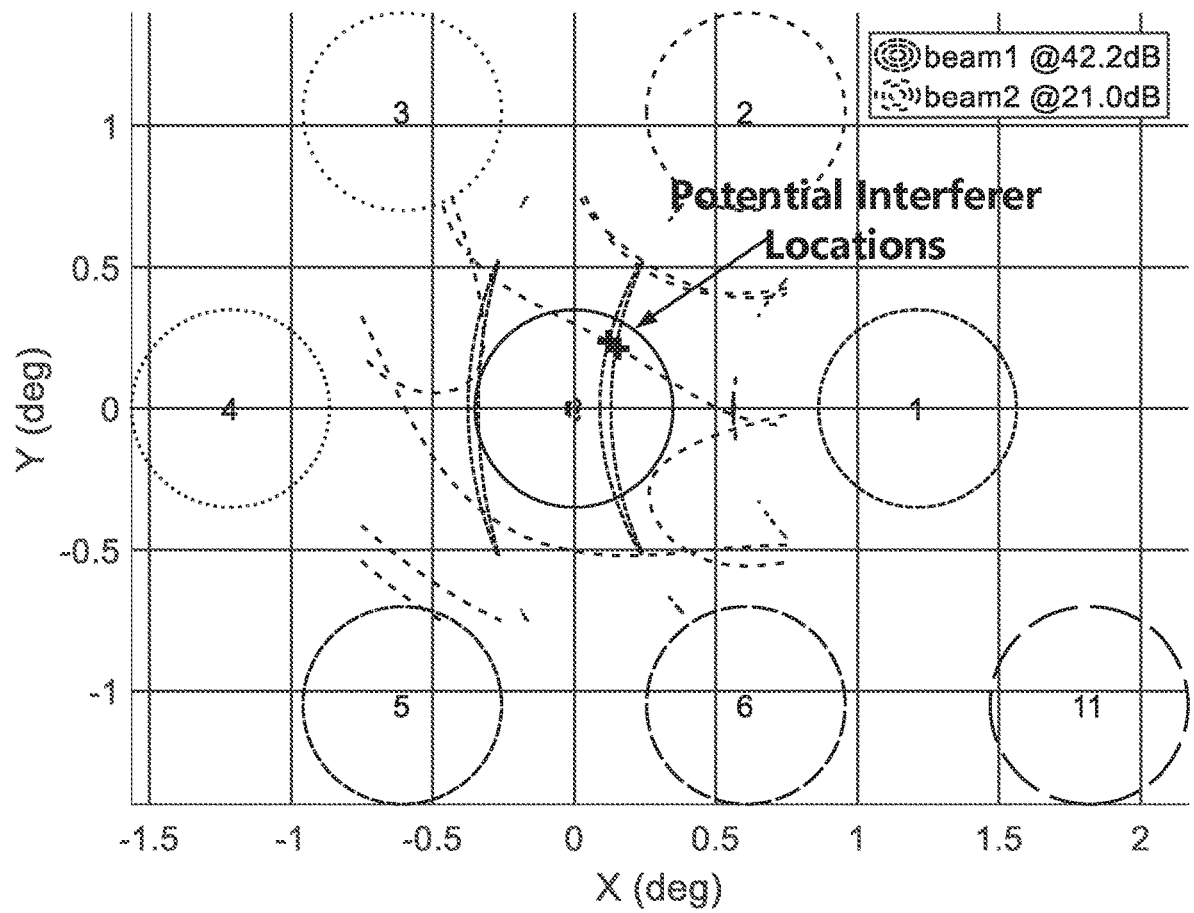
FIG. 8 shows contour lines corresponding to relative gains determined for two beam pairs.
Figure 9:
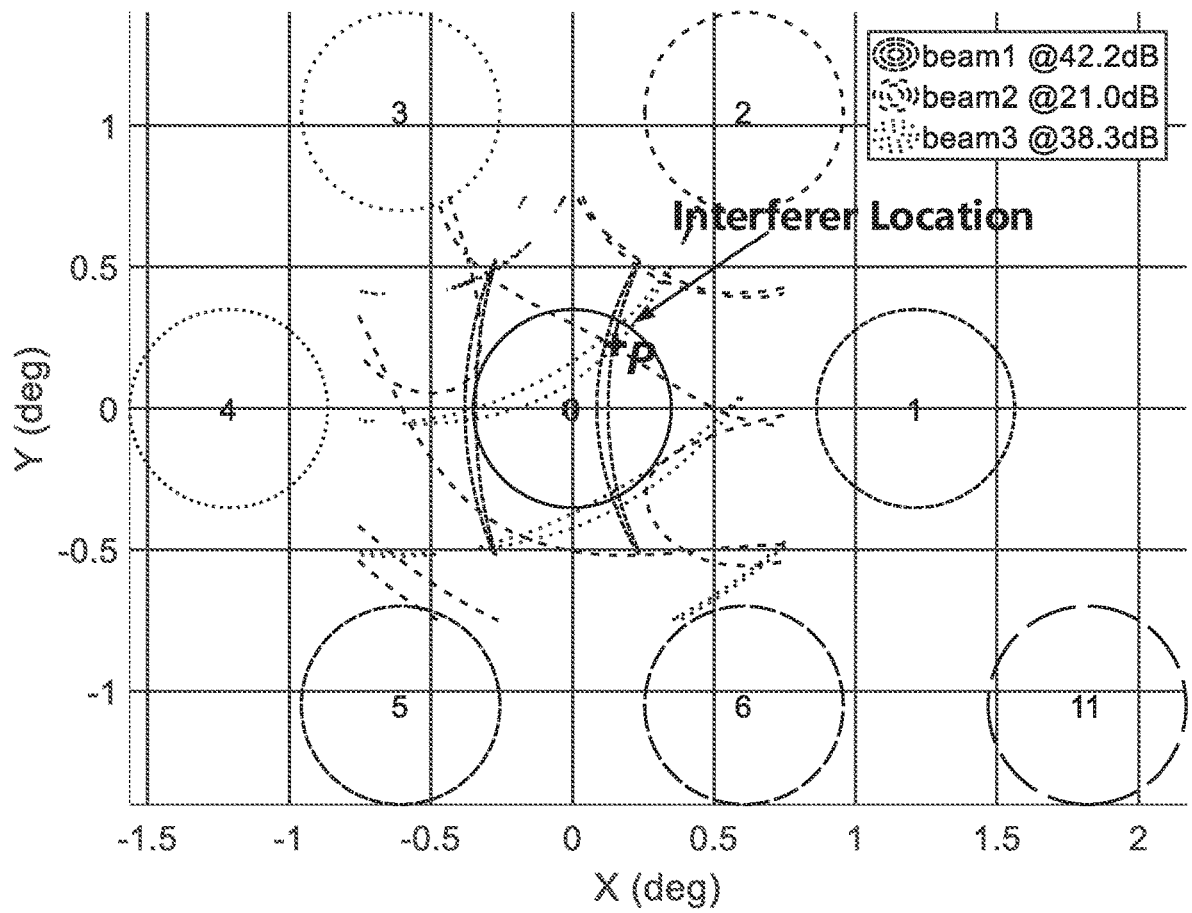
FIG. 9 shows contour lines corresponding to relative gains determined for three beam pairs.
Figure 10:
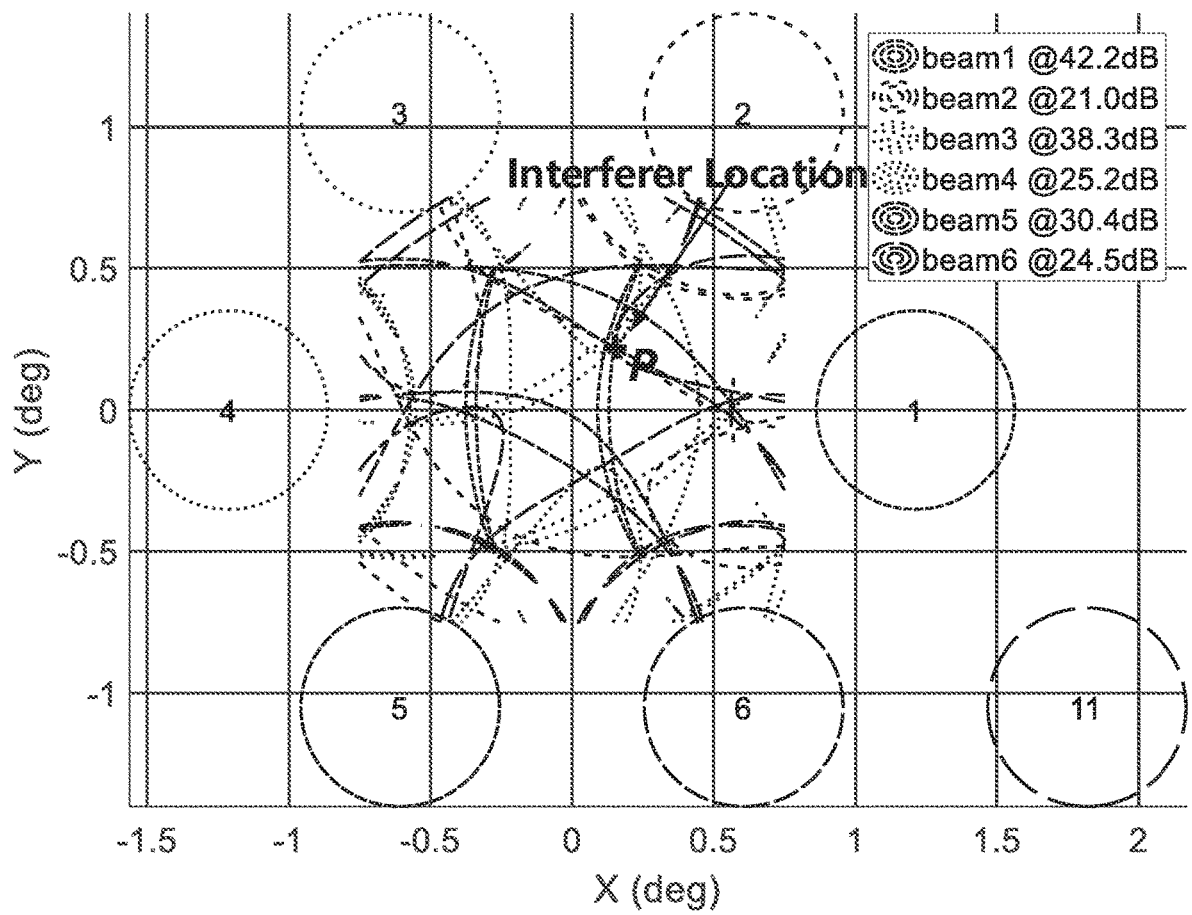
FIG. 10 shows contour lines corresponding to relative gains determined for six beam pairs.

FIG. 7 shows a geographic plot of the contour lines between beam 0 and beam 1 that correspond to the relative gain value of 42.2 dB. FIG. 8 shows the geographic plot with the addition of contour lines between beam 0 and beam 2 corresponding to the relative gain value of 21 dB. It will be noted that the contour lines intersect in multiple locations. In this example, there are two strong candidate locations, as indicated in the figure. Addition of further contour lines for other beam pairs may help identify the best candidate location. FIG. 9 shows the addition of contour lines between beam 0 and beam 3, and FIG. 10 shows the geographic plot with contour lines from all six beam pairs. It will be noted that the use of all six pairs results in a specific location where all six pairs have a contour line intersecting the same point within the beam 0 footprint.

As noted above, in some instances near the EOC, the six surrounding co-colored beams may not be available. Accordingly, more distant co-colored beams may be incorporated into the analysis. Referring again to FIG. 2, in a case where interference is found in beam 0, but only beams 1 and 6 are co-colored nearby beams, the analysis could take into account beams in a "second ring" further away from beam 0, such as beam 11. It will be appreciated that the power level of the interfering carrier may be quite low in beam 11; however, the DCP gain gd may be adjusted, if needed, so as to obtain a reasonably accurate measurement. Relative gain values for this example may be:

|  | HTS beams | | | |
| --- | --- | --- | --- | --- |
|  | Beam 0 | Beam 1 | Beam 6 | Beam 11 |
| DCP carrier power (dBm) | −7.0 | −49.2 | −31.5 | −46.8 |
| Beam relative gain $g_{0,i}$ (dB) | 0.0 | 42.2 | 24.5 | 39.8 |

Figure 11:
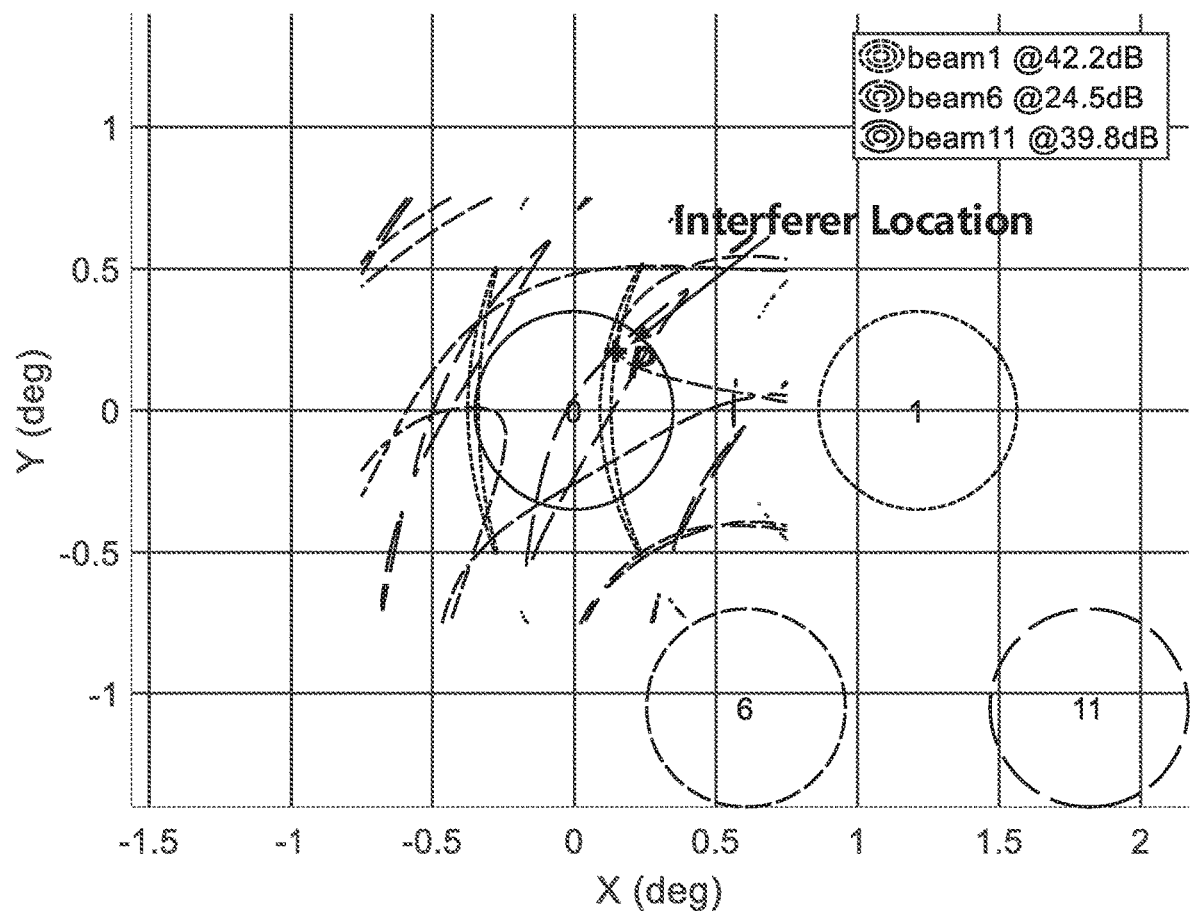
FIG. 11 shows contour lines corresponding to relative gains based on two nearby beam pairs and one more-distant beam pair.

FIG. 11 illustrates the relative gain contour lines from beams 1, 6 and 11 and the identification of the likely interference source location at the intersection of those contour lines within the coverage area of beam 0.

Although the foregoing description may describe the plotting of contour lines, it does not necessarily imply that a map or other image with plotted lines is produced. For visual illustration of the concepts it may be convenient to envision the plotting of contour lines and the identification of an intersection point; however, it will be understood that in many implementations the lines are described in mathematical or numerical terms and the identification of point(s) of intersection may be determined using various numerical methods or algorithms for finding the intersection of two curves.

The beam pattern database may store beam patterns as determined during the HTS test phase, which may be in matrix form, or in any other suitable data structure. The matrix form may, for example, reflect the 2D pattern of gain values for each point in a grid encompassing a particular geographic range. The resolution of measurements may be selected based on a balance of the measurement sensitivity and likely error, the desired geographic resolution for location services, and memory storage limitation.

Figure 12:
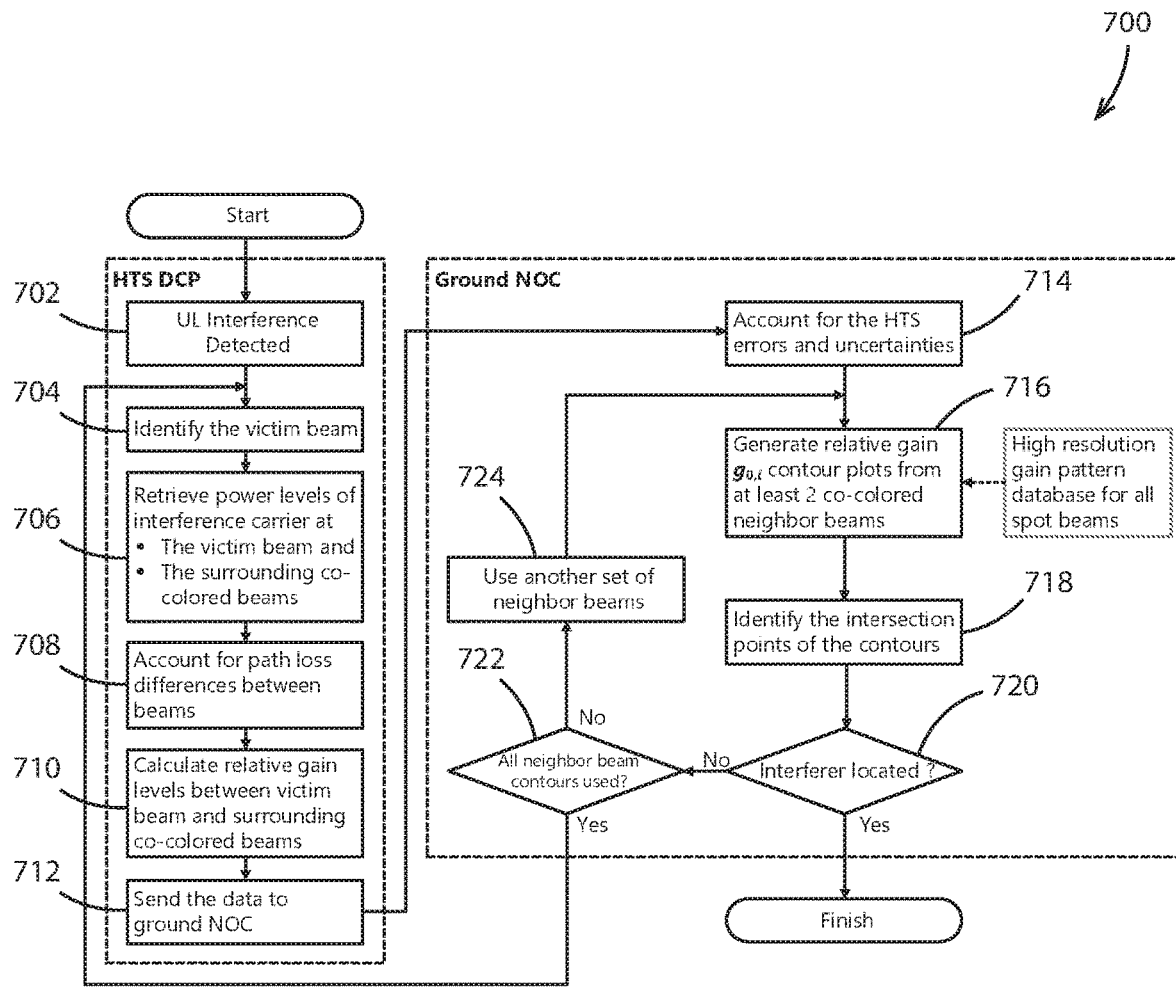
FIG. 12 shows an example method for locating an uplink interference source.

FIG. 12 shows, in flowchart form, an example method 700 for geolocating an uplink interference source. In the example method 700, certain operations are indicated as being performed by the HTS and certain operations are indicated as being performed by the ground NOC. It will be appreciated that in some instances some or all of the operations described as being performed by the ground NOC may be performed by a processing unit at the HTS.

In this example method 700, the HTS first detects uplink interference in operation 702, and then identifies the victim beam in operation 704. In operation 706, the DCP measures the power levels of the interference carrier in victim beam and in the surrounding co-colored beams. The number of surrounding beams measured may depend on whether the victim beam is near the edge of coverage and the color re-use pattern for the HTS.

In operation 708, the DCP accounts for the path loss difference between the beams. This is the determination of the constant c between pairs of beams. Recall that the constant c is found as a ratio of the gr and gd of the two transponder paths. In some implementations, the constant c may be pre-determined and stored in memory for various pairs of co-colored spot beams. In such cases, operation 708 involves retrieving the appropriate constants from memory.

In operation 710, the DCP determines the relative gain for beam pairs and then, in operation 712 of this example, relays those relative gain values to the ground NOC.

At the ground NOC, in this example, certain HTS errors or uncertainties may optionally be accounted for in a manner described further below, as indicated by operation 714.

In operation 716, the relative gains are used to generate contour plots from stored beam pattern data for the pairs of spot beams. In this example, the NOC first determines the contour lines for a first beam pair, beam 0 and beam i. Then, in operation 718, the NOC identifies the intersection(s). With the first beam pair, naturally, no intersection is yet available so the NOC cannot locate the interference source. As indicated by operation 720, the NOC assesses whether an interference location has been identified with sufficient degree of confidence. In operation 722 whether additional beam relative gain data is available and, if so, as shown by operation 724, it then returns to add the next beam pair contour lines and identify the intersection point(s).

The assessment of whether an interference location has been identified in operation 720 may be partly based on a confidence measurement in some embodiments. In some implementations, the measurement may account for the degree of congruence between the intersecting contour lines. In some cases, it may also take into account the angle between the lines at the intersection as lines that are more tangential are more likely to be inaccurate in terms of the intersection point. In some examples, the number of lines that pass through the intersection point may increase the confidence level. The confidence level may be measured based on a determination of distance between intersection points of various beam pairs, with lower distance corresponding to higher confidence.

As noted, the NOC (or DCP) may account for some errors or inconsistencies in operation 714. The identified intersections of contour lines may have slight errors due to the imperfect beam pattern data, errors in accuracy of measured power level, and errors in measurements of relative transponder signal path gains, among other things. Accordingly, the NOC or DCP may, in some instances, use value ranges for relative gain rather than a single value, which may give an intersecting region as opposed to an intersecting point.

Since the desired beam spectrum can be fast swept and sent back via a dedicated high-speed link, even if the interfering carrier is moving (either in frequency domain or geographic position domain), its relative behaviors over the beam spectrum can still be recorded and analyzed in a close to real-time manner, and the proposed geolocation process can be performed nearly instantly.

If the interfering carrier is not a single-frequency/continuous wave (CW) type signal, but a modulated wave occupying a certain bandwidth, the above-mentioned process is still be applicable. The thermal noise underneath the carrier may be excluded in the power measurement.

In some cases, the interfering carrier spectrum overlaps with the normal operating carrier spectrum in at least some of the co-colored neighbor beams. At least three variations can be considered to correctly measure and geo-locate the interferer. First, the process could exclude the use of beams that have an overlapping normal operating carrier. Second, the NOC may temporarily relocate or stop transmission of the overlapped carriers. Third, the DCP may employ onboard carrier-under-carrier technology to directly measure the power of the interfering carrier. This technology has been used in the case of ground carrier monitor systems and may be incorporated into the functionality of the onboard DCP.

The discussion above focusses upon use of the described methods and system to locate a source of an interference signal, whether accidental or malicious in origin. This signal could be a jamming signal, for example. In one example of an accidental source, the interference may come from the side lobe of an uplink station aimed at an adjacent satellite. The geolocation may be used to identify the location of such an interference signal, where the two satellites have similar coverage areas and operate in at least partly the same frequency bands.

The described methods and system may also be applied to locate the source of other signals that are not necessarily characterized as "interference". For example, in some cases it may be used to identify the location of known user equipment. As an illustration, the user equipment may have a failed or disabled GPS module and, in an emergency situation, may require geolocation services from the HTS.

Example embodiments of the present disclosure are not limited to any particular type of satellite or antenna.

The various embodiments presented above are merely examples and are in no way meant to limit the scope of this application. Variations of the innovations described herein will be apparent to persons of ordinary skill in the art, such variations being within the intended scope of the present application. Additionally, the subject matter described herein and in the recited claims intends to cover and embrace all suitable changes in technology.

The invention claimed is:

1. A satellite system to locate an uplink interference source, the system comprising:
   a plurality of co-coloured spot beam antennas to receive uplink signals and with each spot beam having a respective geographic coverage area, the respective coverage areas of the co-coloured spot beam antennas being arranged in a grid of non-overlapping areas in a color re-use pattern;
   a digital channelizing processor to digitally channelize received signals from each co-coloured spot beam antennas to produce respective digitized spectrum and to identify an interference carrier in one of the digitized spectrums and to determine relative power levels between the interference carrier in said one of the digitized spectrums and a lower power interference carrier at a same frequency in two or more of the other respective digitized spectrums; and
   a processor and memory storing a geolocation module executable by the processor, to, for each of the relative power levels, determine contour lines of geographic location based on that relative power level, and to identify a geographical location of the uplink interference source based on an intersection between two or more of the contour lines,
   wherein the relative power level is a ratio of a power level of the interference carrier in said one of the digitized spectrums to a power level of the lower power interference carrier in one of the other respective digitized spectrums.

2. The system of claim 1, wherein the geolocation module includes a beam pattern database storing beam pattern data for each of the spot beam antennas, and wherein the geolocation module is to determine contour lines of geographic location by determining the contour lines using beam pattern data for two spot beams for which one of the relative power levels has been determined.

3. The system of claim 2, wherein the geolocation module is to determine the contour lines by determining geographic locations where the difference between the beam pattern data for each of the two spot beams matches the relative power level determined for those two spot beams.

4. The system of claim 1, wherein the digital channelizing processor is to determine one of the relative power levels by multiplying the ratio by a pre-determined ratio of relative transponder path losses for two spot beams for which said one of the relative power level is to be determined.

5. The system of claim 4, wherein transponder path losses are predetermined and stored in memory, and the digital channelizing processor is to select from said stored transponder path losses.

6. The system of claim 1, wherein the geolocation module is to determine a geographical location by determining a set of contour lines for each of three or more relative power levels, and to identifying a point intersected by a line from each of the sets of contour lines.

7. A method to locate an uplink interference source using a high throughput satellite having a plurality of co-colored spot beam antennas to receive uplink signals and with each spot beam having a respective geographic coverage area, the respective coverage areas of the co-colored spot beam antennas being arranged in a grid of non-overlapping areas in a color re-use pattern, the method comprising:

digitally channelizing received signals from each co-coloured spot beam antennas to produce respective digitized spectrum;

detecting an interference carrier in one of the digitized spectrums;

determining relative power levels between the interference carrier in said one of the digitized spectrums and a lower power interference carrier at a same frequency in two or more of the other respective digitized spectrums;

for each of the relative power levels, determining contour lines of geographic location based on that relative power level; and identifying a geographical location of the uplink interference source based on an intersection between two or more of the contour lines, wherein the relative power level is a ratio of a power level of the interference carrier in said one of the digitized spectrums to a power level of the lower power interference carrier in one of the other respective digitized spectrums.

8. The method of claim 7, wherein determining contour lines of geographic location includes determining the contour lines using beam pattern data for two spot beams for which one of the relative power levels has been determined.

9. The method of claim 8, wherein determining the contour lines includes determining geographic locations where the difference between the beam pattern data for each of the two spot beams matches the relative power level determined for those two spot beams.

10. The method of claim 7, wherein determining the relative power levels includes, for a pair of spot beams associated with one of the relative power levels, multiplying the ratio by a predetermined ratio of relative transponder path losses for said pair of spot beams for which said one of the relative power level is to be determined.

11. The method of claim 10, wherein transponder path losses are predetermined and stored in memory, and wherein multiplying said ratio includes selecting from said stored transponder path losses.

12. The method of claim 7, wherein determining a geographical location includes determining a set of contour lines for each of three or more relative power levels, and identifying a point intersected by a line from each of the sets of contour lines.

13. A method to locate an uplink interference source using a high throughput satellite having a plurality of co-colored spot beam antennas to receive uplink signals and with each spot beam having a respective geographic coverage area, the respective coverage areas of the co-colored spot beam antennas being arranged in a grid of non-overlapping areas in a color re-use pattern, the high throughput satellite to receive and digitally channelize signals from each co-colored spot beam antenna to produce respective digitized spectrum, to detect an interference carrier in one of the digitized spectrums, the method comprising:

receiving, from the high throughput satellite at a ground network operations center via a communications link, data regarding power levels of the interference carrier in three or more of the digitized spectrums;

determining, from the data regarding power levels, relative power levels between the interference carrier in said one of the digitized spectrums and a lower power interference carrier at a same frequency in two or more of the other respective digitized spectrums, wherein the relative power level is a ratio of a power level of the interference carrier in said one of the digitized spectrums to a power level of the lower power interference carrier in one of the other respective digitized spectrums;

for each of the relative power levels, determining contour lines of geographic location based on that relative power level; and identifying a geographical location of the uplink interference source based on an intersection between two or more of the contour lines.

14. The method of claim 13, wherein the relative power levels are determined by the satellite, and wherein receiving the data regarding power levels includes receiving the relative power levels as determined by the satellite.

15. The method of claim 13, wherein the data regarding power levels includes power level measurements taken by the satellite for the interference carrier and the lower power interference carrier, and wherein determining relative power levels includes calculating the relative power levels from the power level measurements.

16. The method of claim 13, wherein determining contour lines of geographic location includes determining the contour lines using beam pattern data for two spot beams for which one of the relative power levels has been determined.

17. The method of claim 16, wherein determining the contour lines includes determining geographic locations where the difference between the beam pattern data for each of the two spot beams matches the relative power level determined for those two spot beams.

18. The method of claim 13, wherein determining the relative power levels includes, for a pair of spot beams associated with one of the relative power levels, multiplying the ratio by a predetermined ratio of relative transponder path losses for said pair of spot beams for which said one of the relative power level is to be determined.

* * * * *